United States Patent Office 3,838,138
Patented Sept. 24, 1974

3,838,138
SHORT CYCLE, THERMALLY STABLE VINYL CHLORIDE-PROPYLENE COPOLYMERS
Michael Langsam, Allentown, Pa., assignor to Air Products and Chemicals, Inc., Allentown, Pa.
No Drawing. Filed Nov. 16, 1972, Ser. No. 307,018
Int. Cl. C08f 1/60, 15/02
U.S. Cl. 260—87.5 C  4 Claims

ABSTRACT OF THE DISCLOSURE

Rigid vinyl chloride-propylene copolymers are prepared over shorter cycle periods by conducting the polymerization process in the presence of a t-butyl perneoalkanoate free-radical catalyst. The novel copolymers, possessing improved thermal stability, contain from about 90 to 99% by weight vinyl chloride, 1 to 10% by weight propylene, and are further characterized by an intrinsic viscosity of 0.5 to 1.5 dl./g. and a melt flow rate of at least 0.1 dg./min., providing resinous compositions which are particularly adaptable to molding and extrusion operations.

BACKGROUND OF THE INVENTION

This invention relates to new and improved vinyl chloride-propylene copolymers and methods for their manufacture. More specifically, it has been discovered that vinyl chloride-propylene copolymers can be prepared over significantly shorter reaction times provided a t-butyl perneoalkanoate catalyst is employed as a source of free-radicals in their polymerization. Surprisingly, the objectives of the present invention are accomplished without sacrificing thermal stability of the resinous material as exhibited by enhanced color-hold properties of the resin.

Vinyl chloride-propylene copolymers possessing high melt flow rates and processability have been developed, which are especially adaptable to standard molding, extruding and coating processes. Such copolymers were first disclosed in U.S. Pat. 3,468,858. Said patent provides for resinous materials containing only a relatively small amount of propylene, which does not alter the many desirable properties commonly associated with rigid vinyl chloride homopolymers. Correspondingly, the advent of these vinyl chloride-propylene copolymers served to overcome the poor flow and stability characteristics which have heretofore limited the range of commercial applications of ordinary polyvinyl chloride because of processing difficulties. Conventional polyvinyl chloride tends to decompose or undergo thermal degradation before reaching a viscosity sufficiently low to assure flow characteristics necessary for many fabricating operations. Thus, vinyl chloride-propylene copolymers having from 1% to about 10% propylene can be used in any of the applications in which vinyl chloride homopolymers have been employed heretofore, as well as those previously excluded because of the inherent processability limitations of the material.

Nevertheless, in spite of this breakthrough in vinyl chloride polymer technology, the rather lengthy and expensive polymerization period needed for their preparation precluded general widespread use of the resin. Rigid vinyl chloride-propylene copolymers having about 1 to 10% propylene, an intrinsic viscosity of 0.5 to 1.5 dl./g. and a melt flow rate of at least 0.1 dg./min., according to U.S. 3,468,858, are most advantageously prepared by suspension polymerization. The reaction can be effectively conducted under moderately elevated temperatures and pressures. Free-radical catalysts conventionally used to initiate polymerization are suggested, like the organic peroxides e.g.—lauroyl peroxide, benzoyl peroxide, including various azo-nitrile catalysts, such as azo-bis-isobutyronitrile (AZN) etc. Such catalysts, when employed in an amount from about 0.15 or 0.2% to about 0.3%, provide reactor cycle times of about 10 to 16 hours. Although it is suggested the subject resins be prepared over periods as short as 8 hours it nevertheless has been found that most desirable conversion rates take place using the foregoing catalysts at reaction times of at least 15 hours and ranging as high as 20 hours.

In an effort to shorter the cycle time needed for preparing vinyl chloride-propylene copolymers, one approach taken was to increase the amount of free-radical catalyst employed in the reaction mixture. Although this method did shorten the conversion time to a more acceptable rate, other drawbacks arose thereby making this method less than satisfactory. Besides the added cost of the final polymer from use of substantially greater amounts of catalyst making it economically unattractive, it was further discovered that resins prepared accordingly lacked required thermal stability properties. This was evidenced by their tendency to darken and discolor when exposed to elevated temperatures.

Further investigation using related t-butyl peroxy pivalate, which is the t-butyl ester of trimethyl acetic acid disclosed in U.S. Pat. 3,420,807, also proved unsuccessful. It was generally felt that shorter reaction times could be achieved with this more active catalyst. However, in each instance, two to three times more catalyst was required to shorten the cycle time than with the initiators of the present invention.

Accordingly, it is a principal object of the present invention to provide novel vinyl chloride-propylene copolymers produced over shorter polymerization periods by means of a t-butyl perneoalkanoate free-radical catalyst for improved thermal stability of the material without the need for excessive amounts of catalyst or heat stabilizer additives.

It is a further object of the instant invention to provide a process for preparing new, short cycle vinyl chloride-propylene copolymers possessing high melt flow rates and processability with enhanced thermal stability.

A still further object is to provide a new and unobvious use for t-butyl perneoalkanoate free-radical catalysts.

These and other objects, features and advantages of this invention will become apparent to those skilled in the art after a reading of the following more detailed description.

PREFERRED EMBODIMENTS OF THE INVENTION

Broadly, the invention is directed to new and improved vinyl chloride-propylene copolymers prepared with a t-butyl perneoalkanoate free-radical catalyst. The particular catalyst provides a combination of shorter reactor cycle time, while correspondingly improving the thermal stability of the resin, as demonstrated by enhanced color-hold properties without requiring heat stabilizing additives.

The novel vinyl chloride-propylene copolymers of the present invention contain about 90 to 99% by weight vinyl chloride, generally from 1 to about 10%, and more preferably, 2 to about 8% by weight propylene, and are characterized by an average molecular weight expressed in terms of intrinsic viscosity of 0.5 to about 1.5 dl./g. in combination with a melt flow rate of at least 0.1 dg./min. These solid resins further possess a modulus of elasticity of at least 100,000 p.s.i. at a maximum temperature within a range from about 65° C. to about 80° C.

As a rule, the melt flow rate will be, at most, about 500 dg./min., and more preferably, about 200 dg./min., a propylene content of 3 to 7% and an intrinsic viscosity of 0.55 to 0.95 dl./g. and most optimally a melt flow rate of about 3 to about 100 dg./min.

As mentioned above, the short cycle. thermally stable resins, free of heat-stabilizing compounds, are prepared by means of a t-butyl perneoalkanoate catalyst. The catalyst in the reaction mixture decomposes to provide the free-radicals necessary to bring about polymerization. These initiators are derived from "neo" acids which denote a series of compounds having their alpha carbon atoms fully substituted with alkyl groups.

The particular t-butyl perneoalkanoates employed herein may be represented by the formula:

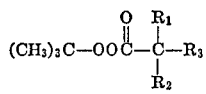

wherein $R_1$, $R_2$ and $R_3$ are alkyl radicals having a summation of from 4 to 8 carbon atoms. Alkyl denotes any branched or straight chain radical such as methyl, ethyl, propyl, isopropyl, butyl, sec.-butyl, t-butyl, pentyl, sec.-pentyl, hexyl and the like. It is apparent from the foregoing that any single alkyl group may not exceed 6 carbon atoms, since the remaining R's would at least be methyl.

The above catalysts are known compounds and are documented, for example in U.S. Pat. 3,624,123. Typically, their preparation entails converting a neoalkanoic acid to its acid halide and esterifying with tertiary butyl alcohol. They are also available through ordinary channels of commerce under such Trademarks as Esperox and Lupersol. Frequently, the commercially available catalysts will be employed as mixtures of isomers, however, for purposes of the present invention, no single isomer of the mixture will have more than 8 carbon atoms to the alpha carbon atoms of the acid moiety.

One example of mixtures of isomers of t-butyl perneoalkanoate will have the following structural formulas:

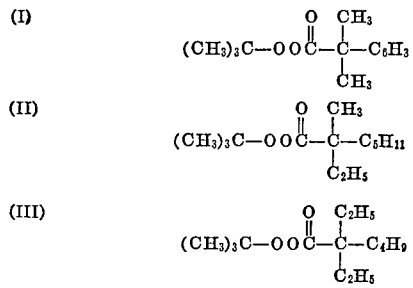

Accordingly, t-butyl perneodecanoate may have, for example, a minor amount of isomer (III), amounting to only about 2% by weight and a major amount of about 98% of isomers (I) and (II) of which isomer (I) will be present at about 33% and isomer (II) at about 67%. Other representative catalysts are shown in the table below.

TABLE

| $R_1$ | $R_2$ | $R_3$ |
|---|---|---|
| t-$C_4H_9$ | $CH_3$ | n-$C_3H_7$ |
| $C_6H_{13}$ | $CH_3$ | $CH_3$ |
| $CH_3$ | i-$C_3H_7$ | $C_4H_9$ |
| $C_3H_7$ | $CH_3$ | t-$C_4H_9$ |
| $C_3H_7$ | sec.-$C_4H_9$ | $CH_3$ |
| $C_2H_5$ | $C_2H_5$ | $C_4H_9$ |
| $CH_3$ | $C_6H_{13}$ | $CH_3$ |
| $C_5H_{11}$ | $CH_3$ | $C_2H_5$ |
| $CH_3$ | $C_2H_5$ | $C_5H_{11}$ |
| $C_2H_5$ | $C_2H_5$ | $CH_3$ |
| $CH_3$ | $CH_3$ | $C_2H_5$ |
| $C_2H_5$ | $C_2H_5$ | $C_2H_5$ |

The catalysts used in preparing short cycle vinyl chloride-propylene generally have a 10 hour half-life temperature of about 35° to about 65°, and more particularly about 48° to 52° C.

The preferred method for making the short cycle, thermally stable vinyl chloride-propylene copolymers of the instant invention is by suspension polymerization where the monomers are copolymerized in an aqueous system, under constant agitation, in the presence of appropriate suspending and surface active agents with the pH maintained at about 5 to 8.5. However, copolymers disclosed herein may also be prepared by emulsion, solution, and bulk polymerization techniques. Processes for their manufacture are outlined in detail in U.S. Pat. 3,468,858 which teachings are incorporated by reference herein.

In carrying out the polymerization operation, an aqueous mixture containing from about 0.05 to about 0.3, and more preferably, from 0.1 to about 0.2 parts by weight of the t-butyl perneoalkanoate per 100 parts by weight of total monomers are charged into a vessel capable of withstanding pressures of up to 250 p.s.i. The initiator may be incorporated into the mixture in a single step, or alternatively, incrementally added as polymerization progresses. With incremental multiple addition a major amount may be used at the beginning of the cycle with aliquot portions of the balance being added during the cycle. The aqueous mixture may also have dissolved therein suspending and wetting agents such as hydroxymethyl and hydroxyethyl cellulose, polyvinyl alcohol and preferably, partially hydrolyzed polyvinyl alcohol, gelatin, sodium lauryl sulfate and the like. They are ordinarily used in amounts from about 0.01 to 0.5% by weight based upon the weight of the monomers. Temperatures of about 70–80° C. should effectuate dissolution of the wetting and suspending agents.

After dissolution of the aqueous mixture with the catalyst, etc., the pressure vessel is capped and flushed with nitrogen followed by vinyl chloride monomer in vapor form. Once agitation begins, vinyl chloride (liquified) and propylene (gas or liquid) monomers are introduced. The system is then brought to a reaction temperature of from about 35 to 70° C., and more optimally, from about 45 to 60° C. with constant agitation. Under these conditions, using homogenous t-butyl perneoalkanoate or isomeric mixtures of the same, reaction times should be about 8 hours or less.

To show the distingiushing properties of resins prepared in the presence of t-butyl perneoalkanoate catalysts, according to the present invention, and related solid polymers manufactured with other free-radical catalysts, the following laboratory procedure may be employed.

HEAT STABILITY TEST

The particular raw resin is first pressed into a transparent disc of uniform thickness by fusing each resin in a cavity mold of 40 mil thickness. Minimal time and temperature are used to effect the initial fusion. A Perkin-Elmer Model 202 Spectrophotometer is used to determine the absorption spectra in the visible and near ultra violet light regions. This is completed for each resin disc at time zero (no heating) and at intervals during a uniform heating of the sampled discs at 150° C., in a forced draft oven. The change in absorption threshold is recorded as a function at time of heating.

The following specific examples illustrate the preparation of short cycle, thermally stable vinyl chloride-propylene copolymers prepared in the presence of t-butyl perneoalkanoate catalysts. It is to be understood, however, that these examples are for illustrative purposes only and do not purport to be wholly definitive as to conditions and scope.

EXAMPLE I

In a separate vessel, a solution of suspending and wetting agent were prepared. 0.016 parts Aerosol-OT (dioctyl sodium sufosuccinate) were stirred into 200 ml. distilled water and heated to about 780° C. with agitation and 0.18 parts by weight hydroxymethyl cellulose were then added to the solution. 0.01 parts by weight sodium bicarbonate buffer were added to the aqueous mixture. A steel autoclave was then charged with 200 parts by weight of the above solution and 0.200 parts by weight per 100 parts by weight of total monomers of t-butyl perneodecanoate catalyst which is 75% active in odorless mineral spirits. The reactor was capped and flushed with nitrogen and vinyl chloride vapor. Liquefied vinyl chloride was then added followed by propylene. A sufficient amount of propylene was charged into the reactor to provide the final product with a propylene content of 4.1% by weight. The reaction mixture was agitated and heated to 54.5° C. for 7 hours. The vinyl chloride-propylene copolymer had an intrinsic viscosity as measured in cyclohexanone at 30° C. of about 0.60 dl./g., a melt flow rate of 75 dg./min. The product was a fine, white, freeflowing material. It was labeled Sample A.

EXAMPLE II

For purposes of comparison, another vinyl chloride-propylene copolymer was prepared. However, ($\alpha,\gamma$ dimethyl valeronitrile) azo-bis (Vazo-52) free-radical catalyst was substituted for the t-butyl perneodecanoate of Example I. 0.275 parts by weight of the catalyst per 100 parts by weight of total monomers were added. The reaction was also conducted over a 7 hour cycle at 54.5° C. to provide a product also having 4.1% propylene, an intrinsic viscosity $[\eta]$ of about 0.6 dl./g. The melt flow was about 73 dg./min. The material was labeled Sample B.

A control resin was also prepared in accordance with the above procedures using Vazo-52 catalysts in an amount of 0.115 parts by weight per 100 parts by weight of total monomers. Here, the cycle time was 18 hours. The intrinsic viscosity of the final product was 0.61 dl./g. The melt flow was 75 dg./min. Propylene content was also 4.1%. Both the product of Example II and the above control were white powdery materials. The control was labeled Sample C.

cycle. Sample A prepared with t-butyl perneodecanoate over a cycle time of 7 hours did not turn dark (no light transmission) until 135 minutes of heating at 150° C. The thermal stability properties of the short cycle, vinyl chloride-propylene resin (Sample A) were signficantly improved over the conventional 18 hour cycle material (Sample C).

TABLE B

| Example | Propylene, percent | Cycle time (hours) | I.V. [n] | Melt flow (dg./min.) |
|---|---|---|---|---|
| III [1] | 2.3 | 7 | 0.759 | 0.3499 |
| IV [2] | 2.3 | 7 | 0.777 | 0.2014 |
| V [3] | 2.3 | 7½ | 0.759 | 0.1530 |
| VI [4] | 2.3 | 8½ | 0.780 | 0.1111 |
| VII [5] | 2.3 | 7½ | 0.732 | 0.2347 |

[1] Lupersol 223: 2 ethylhexyl (peroxydicarbonate)—2.5 ml./100 parts by weight of total monomers.
[2] P-16: Di(4 t-butyl cyclohexyl) peroxydicarbonate—1.2 gm./100 parts by weight of total monomers.
[3] Esperox-33M: t-Butyl peroxyneodecanoate—1.25 ml./100 parts by weight of total monomers.
[4] Vazo-52: (Alpha gamma dimethyl valeronitrile) azo bis—1 gm./100 parts by weight of total monomers.
[5] Lupersol 11: t-Butyl peroxy pivalate—3.1 ml./100 parts by weight of total monomers.

The resins of Examples III–VII were prepared in accordance with the method of Example I. However, sufficient propylene was used to provide each with 2.3%. The molecular weights expressed in terms of intrinsic viscosity and melt flow rates of each of the polymers were virtually identical. The temperature of polymerization was 50° C.

The resins of Examples III–VII were pressed into discs of uniform thickness for the purpose of testing thermal stability according to the method described above. The results are shown in Table C below.

TABLE C

| | Example III 2.50 ml. catalyst [1] | | Example IV 1.20 gm. catalyst [2] | | Example V 1.25 ml. catalyst [3] | | Example VI 1.0 gm. catalyst [4] | | Example VII 3.10 ml. catalyst [5] | |
|---|---|---|---|---|---|---|---|---|---|---|
| Time (min.) | Absorption | U/V threshold | Absorption | U/V threshold | Absorption | U/V threshold | Absorption | U/V threshold | Absorption | U/V threshold |
| 0 | .26 | 240 | .42 | 253 | .07 | 232 | .34 | 238 | .10 | 232 |
| 5 | .39 | 246 | .74 | 258 | .16 | 244 | .51 | 247 | .21 | 236 |
| 10 | .47 | 249 | .87 | 282 | .19 | 245 | .63 | 254 | .25 | 238 |
| 20 | .72 | 259 | 1.24 | 390 | .31 | 246 | .82 | 308 | .33 | 245 |
| 40 | 1.20 | >390 | >1.50 | >390 | .59 | 314 | 1.31 | >390 | .56 | 297 |
| 60 | | | | | .83 | >390 | | | .78 | 390 |

NOTE.—For references see footnotes on Table B.

Portions of Samples A, B and C were pressed into discs of uniform thickness for comparing their thermal stability. The results are shown in Table A below.

TABLE A

| | Sample A Cycle: 7 hrs., catalyst: 0.2 parts by weight | | Sample B Cycle: 7 hrs., catalyst: 0.275 parts by weight | | Sample C Cycle: 18 hrs., catalyst: 0.115 parts by weight | |
|---|---|---|---|---|---|---|
| Time (min.) | Absorption | U/V threshold, mμ | Absorption | U/V threshold, mμ | Absorption | U/V threshold, mμ |
| 0 | .3 | 232 | .51 | 245 | .33 | 234 |
| 5 | .69 | 245 | >1.50 | 750 | .99 | 270 |
| 10 | .76 | 252 | | | 1.02 | 290 |
| 15 | .92 | 265 | | | 1.04 | 296 |
| 20 | .93 | 272 | | | 1.03 | 300 |
| 30 | .92 | 296 | | | 1.08 | 334 |
| 40 | 1.03 | 341 | | | 1.11 | 356 |
| 50 | 1.03 | 376 | | | 1.16 | 383 |
| 60 | 1.06 | 390 | | | 1.20 | 460 |
| 75 | 1.10 | 490 | | | 1.31 | 558 |
| 105 | 1.26 | 560 | | | >1.50 | >580 |
| 135 | 1.50 | 580 | | | | |

The test data in Table A shows, at the very early periods of heating, discoloration of Sample B as demonstrated by diminished transmission of light, and after 5 minutes of heating Sample B turned black resulting in no transmission of light. Control Sample C prepared with less of the same catalyst as Sample B failed to transmit light after 105 minutes of heating at which time the disc turned black. Although the thermal stabiilty of Sample C was improved over Sample B, the resin was prepared over an 18 hour Table C illustrates short cycle vinyl chloride-propylene resins with conversion times ranging from 7 to 8½ hours. Each had a propylene content of 2.3%. The intrinsic viscosity and melt flow rates for each polymer were virtually identical. However, the products of Examples III, IV, and VI darkened in the shortest period of time, thus showing, the poorest thermal stability. Although Example VII prepared with t-butyl peroxy pivalate catalyst demonstrated stability comparable to Example V copolymer prepared with t-butyl perneodecanoate according to the present invention, the former required about 2½ times more catalyst to achieve this result than the latter.

EXAMPLE VIII

To demonstrate the technique of incremental multiple adition of catalyst in the preparation of short cycle vinyl chloride-propylene copolymer 0.04 parts of hydroxymethyl cellulose and 0.01 parts of sodium bicarbonate are first dissolved in 150 parts of deionized water. To this aqueous phase was added 95 parts vinyl chloride and 5 parts propylene. Initially, 0.12 parts by weight per hundred parts by weight of total monomers of active t-butyl perneodecanoate catalyst were added with the vinyl chloride. The catalyst used was a mixture of compounds comprising about 98% of isomers (1) $R_1$ and $R_2$ were methyl and ethyl and $R_3$ was pentyl and (2) $R_1$ and $R_2$ were each methyl and $R_3$ was hexyl wherein (1) and (2) were present in a ratio of about 2 to 1. The balance of the catalyst (2%) comprised an isomer in which $R_1$ and $R_2$ were each ethyl and R₃ was butyl. The temperature of reaction was rapidly raised to 124° F. After four hours into the cycle any additional quanitity of catalyst, 0.06 phr., was added to the reactor. This was repeated again after six hours and after 7½ hours conversion was complete. Thermal stability of the final product was determined according to the above heat stability test. The product showed stability superior to those products produced in Example II.

While the invention has been described in conjunction with specific examples thereof, this is illustrative only. Accordingly, amny alternatives, modifications and variations will be apparent to those skilled in the art in light of the foregoing description and it is therefore intended to embrace all such alternatives, modifications and variations as to fall within the spirit and broad scope of the appended claims.

I claim:

1. A process for preparing short cycle vinyl chloride-propylene copolymers having improved thermal stability and comprising from about 90 to about 98% by weight vinyl chloride, from about 2 to about 10% by weight propylene, an intrinsic viscosity of 0.5 to about 1.5 dl./g., a melt flow rate of at least 0.1 dg./min., which process comprises charging a reaction vessel with an aqueous mixture containing from about 0.05 to about 0.3 parts by weight per 100 parts by weight of total monomers of a t-butyl perneoalkanoate free-radical catalyst or mixtures thereof, introducing the vinyl chloride and propylene monomers into the reaction vessel and bringing the reaction mixture to a temperature sufficient to initiate polymerization, said catalyst comprising a mixture of insomers of the formula:

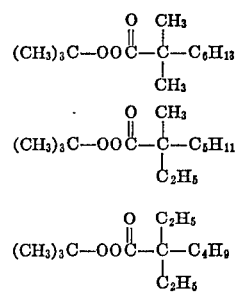

and

2. The process of claim 1 wherein a wetting and suspending agent are incorporated into the aqueous mixture.

3. The process of claim 1 wherein polymerization is conducted at a temperature of from about 35° to about 70° C.

4. The process of claim 1 wherein the free-radical catalyst is incrementally added to the reaction vessel.

References Cited
UNITED STATES PATENTS

| | | | |
|---|---|---|---|
| 3,468,858 | 9/1969 | Heiberger et al. | 260—87.5 |
| 3,468,859 | 9/1969 | Davies | 260—87.5 |
| 3,558,585 | 1/1971 | Chatelain et al. | 260—92.8 |
| 3,583,956 | 6/1971 | Pointer et al. | 260—86.3 |
| 3,624,123 | 11/1971 | Lewis et al. | 260—453 R |
| 3,642,745 | 2/1972 | Golstein | 260—87.5 C |

STANFORD M. LEVIN, Primary Examiner

U.S. Cl. X.R.

260—32.8 R